United States Patent
Asai et al.

(10) Patent No.: US 7,532,365 B2
(45) Date of Patent: May 12, 2009

(54) THRESHOLD MATRIX GENERATION METHOD, THRESHOLD MATRIX GENERATION APPARATUS, AND RECORDING MEDIUM

(75) Inventors: Hiroshi Asai, Kyoto (JP); Masayuki Nakano, Kyoto (JP); Yasuhiro Takemoto, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 666 days.

(21) Appl. No.: 11/326,481

(22) Filed: Jan. 6, 2006

(65) Prior Publication Data
US 2006/0152767 A1 Jul. 13, 2006

(30) Foreign Application Priority Data
Jan. 7, 2005 (JP) .......................... P2005-003016

(51) Int. Cl.
| | |
|---|---|
| H04N 1/405 | (2006.01) |
| G06K 15/00 | (2006.01) |
| H04N 1/40 | (2006.01) |
| H04N 1/407 | (2006.01) |
| B41C 1/02 | (2006.01) |
| G06K 9/46 | (2006.01) |
| G06K 9/38 | (2006.01) |
| G09G 5/02 | (2006.01) |

(52) U.S. Cl. ...................... 358/3.13; 358/3.1; 358/3.06; 358/3.19; 358/3.22; 358/3.27; 358/3.23; 358/3.3; 382/237; 382/270; 345/596

(58) Field of Classification Search ......... 358/1.9–3.27, 358/465–466, 534–536; 382/237, 270; 345/596–599
See application file for complete search history.

(56) References Cited

U.S. PATENT DOCUMENTS
5,859,955 A 1/1999 Wang

FOREIGN PATENT DOCUMENTS
| | | |
|---|---|---|
| JP | 10-84477 A | 3/1998 |
| JP | 2001-186346 A | 7/2001 |
| JP | 3427026 | 7/2003 |
| JP | 3481423 | 12/2003 |

*Primary Examiner*—Twyler L Haskins
*Assistant Examiner*—Barbara D Reinier
(74) *Attorney, Agent, or Firm*—McDermott Will & Emery LLP

(57) ABSTRACT

In a threshold matrix generation part 3 implemented by a computer, a tint image in a specified gray level is generated from temporary lighting order set in a matrix area, and a smoothing operation is performed on the tint image, to generate a grayscale evaluation image. The lighting order is modified by changing ordinal numbers in the lighting order of respective positions included in specified areas in the matrix area which correspond to areas around boundaries of halftone dot areas in the tint image on the basis of values of corresponding pixels in the evaluation image. With this operation, when the smoothing operation is performed on a tint image in the specified gray level generated in accordance with a modified lighting order, a variation among values of pixels included in the specified areas becomes smaller than a variation among values of pixels included in the specified areas in a case where the smoothing operation is performed on the tint image in the specified gray level generated in accordance with an unmodified lighting order. Then, threshold values are determined in the matrix area with reflecting the modified lighting order, to generate the threshold matrix which is possible to suppress graininess in a generated halftone dot image.

23 Claims, 8 Drawing Sheets

LOW (HIGHLIGHT) → HIGH (SHADOW) GRAY LEVEL

THRESHOLD MATRIX GENERATION METHOD, THRESHOLD MATRIX GENERATION APPARATUS, AND RECORDING MEDIUM

BACKGROUND OF THE INVENTION

1. Field of the Invention

The present invention relates to a threshold matrix which is compared with a grayscale original image in generating a halftone dot image representing the original image.

2. Description of the Background Art

In many cases where printing data or printing plate data are made from grayscale images, creation of halftone dots, as one of halftoning method, is used. Among well-known types of dot shape are square, chain, elliptical one, round one or the like. In a generally-used AM (Amplitude Modulated) halftoning, grayscale representation is made by changing the size of dots, instead of changing the number of dots constituting a halftone dot image. But since the dots are regularly arranged, respective dots connect to adjacent dots almost simultaneous in a specified gray level (a gray level in specified tone value), and change of gray levels seems to be discontinuous even if intended change of gray levels is continuous. This is so-called tone jump. Also, there is a problem that there arises moire in a halftone dot image generated from a periodic image.

Japanese Patent Publication No. 3427026 (Document 1) discloses a method where after the centers of halftone cells are arranged irregularly, connecting of dots is performed at random and U.S. Pat. No. 5,859,955 (Document 2) discloses a method where a plurality of highlight-side halftone cell centers and a plurality of shadow-side halftone cell centers are arranged while being stochastically distributed. In the cases of using these methods, occurrence of moire is suppressed, connecting of dots occurs in a wide range of gray levels (for example, a range covering from about 20% to 30% of all gray levels around middle gray level) depending on growing method of halftone dots, and therefore the tone jump is reduced.

A technique disclosed in paragraph 0021 of Japanese Patent Publication No. 3481423 (Document 3) is that a smoothing operation is performed on a tint image by using a filter whose size is 4.25 times an average distance between the centers of dots in halftone dot areas, with respect to each of row and column directions.

In the cases of utilizing the methods of Documents 1 and 2, however, large clusters which are formed by connecting adjacent dots and small clusters which are isolated dots are mixed irregularly in a range of gray levels where connecting of dots occurs, and this causes graininess in a generated halftone dot image.

SUMMARY OF THE INVENTION

The present invention is intended for a threshold matrix generation method for generating a threshold matrix which is compared with a grayscale original image in generating a halftone dot image representing the original image. It is an object of the present invention to generate the threshold matrix which is possible to suppress graininess in a generated halftone dot image.

The threshold matrix generation method comprises the steps of a) setting ordinal numbers in lighting order to respective positions within a matrix area in which a threshold matrix is generated so that connecting of dots of halftone dot areas occurs at random with increase of gray level within a predetermined range, the lighting order indicating an order for including pixels in the halftone dot areas with increase of gray level, b) binarizing the ordinal numbers in the matrix area on the basis of a specified gray level within the predetermined range of gray level to generate a tint image, c) generating a grayscale evaluation image by performing a smoothing operation on the tint image, d) modifying the lighting order by changing ordinal numbers of positions included in at least specified areas which correspond to areas around boundaries of halftone dot areas in the tint image on the basis of values of corresponding pixels in the evaluation image, and e) determining threshold values in the matrix area with reflecting a modified lighting order, and in the method, a variation among values of pixels included in the specified areas in a grayscale image which is generated by performing steps b) and c) on ordinal numbers in the modified lighting order is smaller than a variation among values of pixels included in the specified areas in a grayscale image which is generated by performing steps b) and c) on ordinal numbers in the lighting order which is set in the step a).

According to the present invention, it is possible to suppress graininess in a halftone dot image which is generated by using the threshold matrix.

Normally, a plurality of halftone cells are set in the matrix area and ordinal numbers in lighting order are set in respective positions within the matrix area so that halftone dot areas vary with change in gray level in accordance with shapes of the plurality of halftone cells in the step a). Also, preferably, the plurality of halftone cells are set at random in irregular shapes in the matrix area in the step a).

According to one preferred embodiment of the present invention, a plurality of halftone cells including a plurality of highlight-side halftone cells in each of which a halftone dot area grows from the center toward a peripheral portion according to increase in highlight-side gray level and a plurality of shadow-side halftone cells in each of which a halftone dot area grows from a peripheral portion toward the center according to increase in shadow-side gray level are set in the step a), and thereby a threshold matrix which is possible to generate preferable halftone dots is generated.

According to another preferred embodiment of the present invention, a halftone structure is removed from the tint image by performing the smoothing operation in the step c), the step d) includes a calculation where an ordinal number in the lighting order of each position included in at least the specified areas in the matrix area is divided by a value of a corresponding pixel in the evaluation image, or a calculation where the value of the corresponding pixel is subtracted from the ordinal number, and thereby the ordinal number in the lighting order of each position included in the specified areas is changed appropriately.

According to still another preferred embodiment of the present invention, degree of change of an ordinal number on each position included in the specified areas is magnified by using a function where an output value becomes greater as an ordinal number which is inputted becomes close to the median value in the lighting order in the step d), and thereby the ordinal number in the lighting order of each position included in the specified areas is changed appropriately.

According to an aspect of the present invention, a size of a filter used in the smoothing operation is made not smaller than one time and not larger than 4.25 times an average distance between the centers of dots generated in halftone dot areas in highlight-side gray level, with respect to each of a row direction and a column direction of the matrix area. This allows performing the smoothing operation on the tint image appropriately.

The present invention is also intended for a threshold matrix generation apparatus for generating a threshold matrix which is compared with a grayscale original image in generating a halftone dot image representing the original image.

The present invention is further intended for a computer-readable recording medium in which data of a threshold matrix is recorded.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
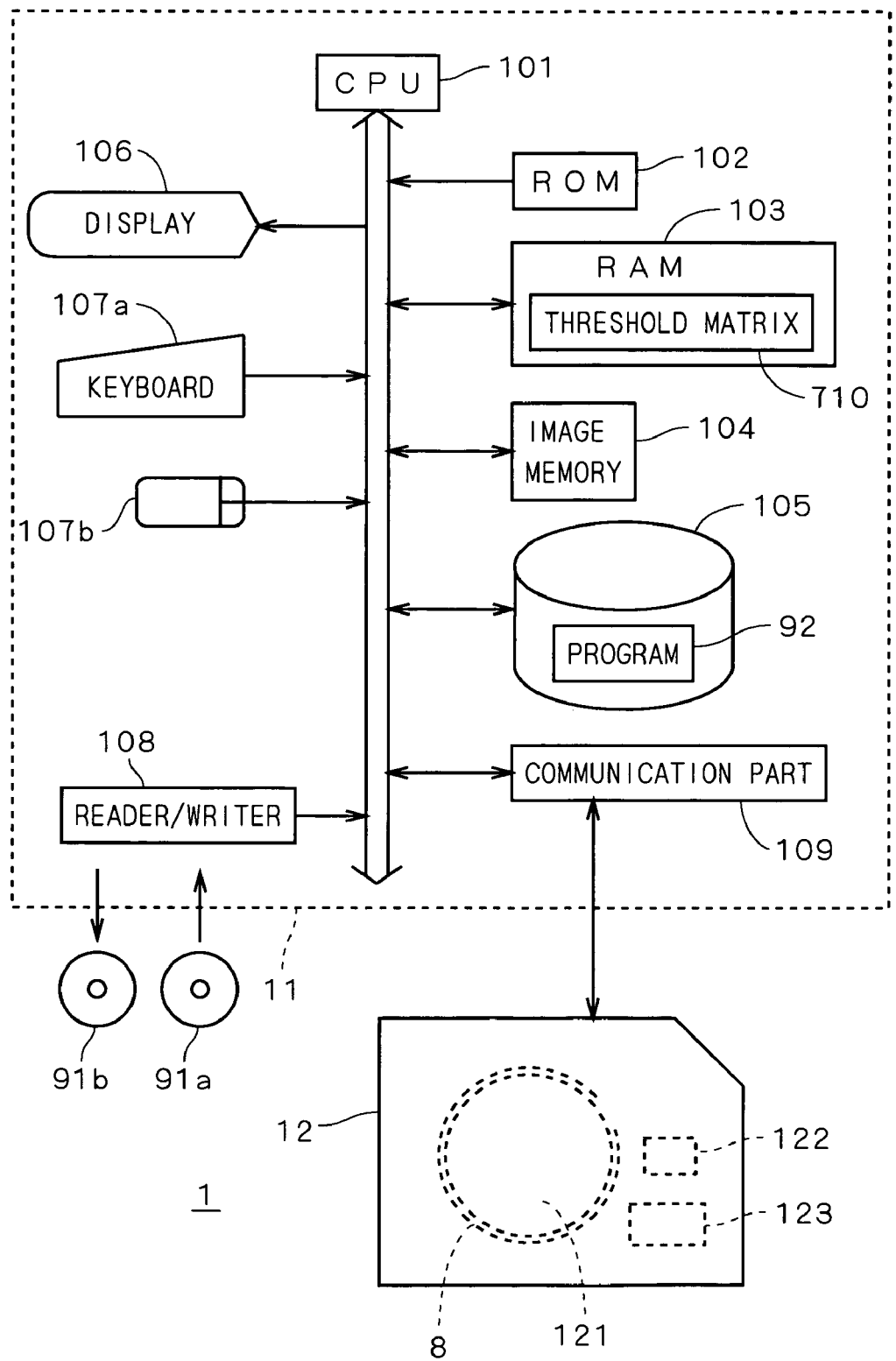
FIG. 1 is a view showing a construction of an image recording system.

FIG. 1 is a view showing a construction of an image recording system 1 in accordance with the first preferred embodiment of the present invention. The image recording system 1 comprises a computer 11 and an image recording apparatus 12, and the image recording apparatus 12 receives a signal from the computer 11 and records halftone dots on a printing plate serving as a halftone dot recording medium by using light beams from a multichannel laser or the like. The image recording apparatus 12 may be a printing apparatus of another recording mode such as an electrophotographic or ink-jet printing apparatus using a photosensitive drum or printing paper, respectively, as the halftone dot recording medium.

The computer 11 has a constitution of general computer system where a CPU 101 for performing various computations, a ROM 102 for storing a basic program and a RAM 103 for storing various information are connected to a bus line. To the bus line, an image memory 104 for storing data of a grayscale image (hereinafter, referred to as "original image") to be represented by halftone dots (screening), a fixed disk 105 for storing information, a display 106 for displaying various information, a keyboard 107a and a mouse 107b for receiving an input from an operator, a reader/writer 108 for reading information from a computer-readable recording medium 91a such as an optical disk, a magnetic disk or a magneto-optic disk and writing information into a recording medium 91b, and a communication part 109 for making communications with the image recording apparatus 12 are further connected through interfaces (I/F) as appropriate.

The image recording apparatus 12 comprises a drum 121 holding a printing plate 8 on its side surface, a writing head 122 for outputting light beams which are modulated in multichannel towards the printing plate 8, a signal generation circuit 123 for generating a signal of halftone dot image to be transmitted to the writing head 122, a driving mechanism for scanning the writing head 122 with respect to the printing plate 8 by rotating the drum 121 and moving the writing head 122 along a rotation axis of the drum 121, and the like. In the following discussion, "pixel" refers to one unit for recording (writing) in the image recording apparatus 12 and corresponds to one spot by one light beam.

In the computer 11, a program 92 is read out from the recording medium 91a through the reader/writer 108 in advance and stored in the fixed disk 105. Then, the program 92 is copied in the RAM 103 and the CPU 101 performs a computation according to the program 92 in the RAM 103 (that is, the computer 11 executes the program), by which the computer 11 operates as a threshold matrix generation part for generating a threshold matrix (SPM (Screen Pattern Memory) data) 710 to be used for formation of halftone dots, which is discussed later. The threshold matrix generation part will be discussed later.

The threshold matrix 710 and the data of the grayscale original image stored in the image memory 104 are transmitted to the image recording apparatus 12 through the communication part 109, the signal generation circuit 123 in the image recording apparatus 12 generates signals of halftone dots used to represent the original image and the halftone dots are recorded on the printing plate 8 on the basis of the halftone signals while the writing head 122 is scanned with respect to the printing plate 8.

In the image recording system 1 for generating a halftone dot image, recording the halftone dots on the printing plate 8 may be regarded as (physical) formation of the halftone dot image, and generation of the signals for the halftone dots may be regarded as (nonphysical) formation of the halftone dot image. The generation of the signals for the halftone dots may be performed by software with the computer 11 and in this case, the computer 11 is an apparatus which solely forms the halftone dot image on the basis of the original image.

Figure 2:
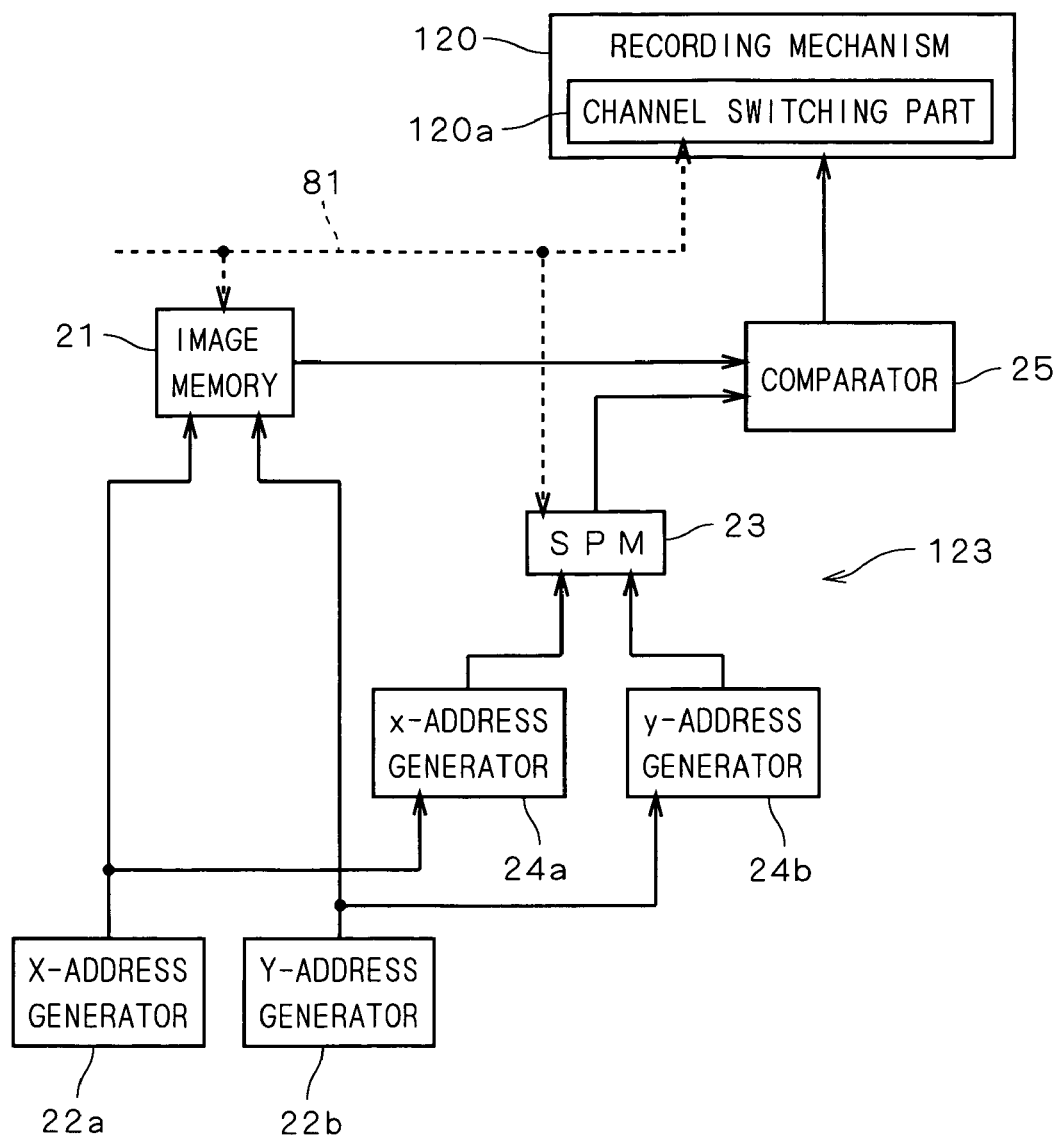
FIG. 2 is a block diagram showing constituent elements of a signal generation circuit and a recording mechanism.

FIG. 2 is a block diagram showing constituent elements of the signal generation circuit 123 in the image recording apparatus 12 and a recording mechanism 120. The recording mechanism 120 corresponds to the drum 121, the writing head 122, a mechanism for driving these elements, a circuit for controlling these elements or the like.

The signal generation circuit 123 comprises an image memory 21 for storing data of the grayscale original image, an X-address generator 22a and a Y-address generator 22b for generating a subscan address (X address) and a main scan address (Y address) in the original image, respectively, an SPM (Screen Pattern Memory) 23 for storing the threshold matrix 710 generated by the computer 11, an x-address generator 24a and a y-address generator 24b for generating a subscan address (x address) and a main scan address (y address) in the threshold matrix 710, respectively, and a comparator 25.

Figure 3:
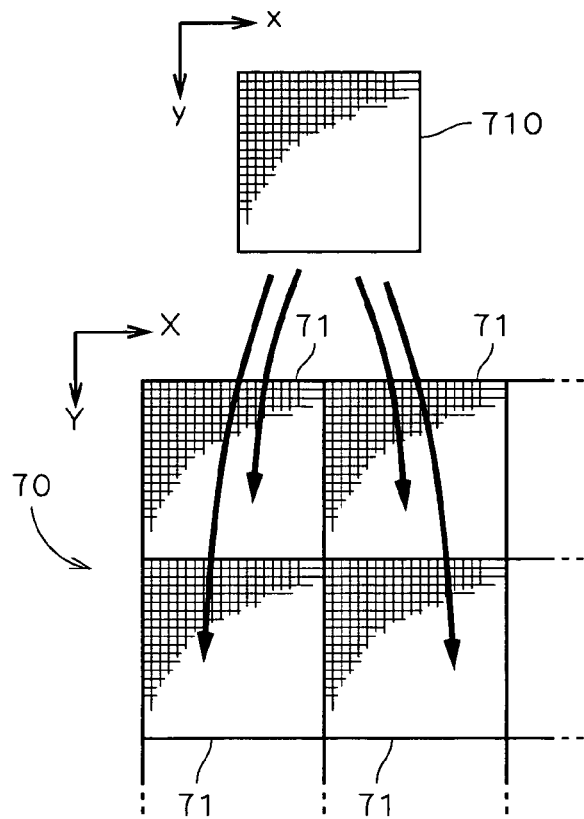
FIG. 3 is a view showing repeat areas and a threshold matrix.

In creating halftone dots of the original image, as shown in FIG. 3, the original image 70 is divided into a lot of areas having the same size to set repeat areas 71 each serving as a unit for creation of halftone dots. The SPM 23 has a storage area corresponding to one repeat area 71, and sets a threshold value for each address (coordinates) of the storage area to store the threshold matrix 710. Then, conceptually, each repeat area 71 of the original image 70 and the threshold matrix 710 are superposed and the value of each pixel in the repeat area 71 is compared with a corresponding threshold value in the threshold matrix 710, to thereby determine whether writing should be performed on the position of the pixel on the halftone dot recording medium or not. Therefore, if the value of the pixel of the original image 70 is uniform, writing is performed on a pixel having an address where a threshold value smaller than the value of the pixel is set in the threshold matrix 710 and macroscopically, uniform halftone dots are generated. Actually, since the original image 70 has gradation (i.e., portions having various values of pixels), the halftone dots vary in the repeat area 71 in accordance with the gradation in the original image 70.

Specific discussion will be made on creation of halftone dots, referring to FIG. 2. The value of one pixel in the original image is read out from the image memory 21 on the basis of an X address and a Y address from the X-address generator 22a and the Y-address generator 22b, respectively. On the other hand, an x address and a y address in the repeat area corresponding to the X address and the Y address in the original image are obtained by the x-address generator 24a and the y-address generator 24b, respectively, and one threshold value in the threshold matrix 710 is thereby specified and read out from the SPM 23. The comparator 25 compares the value of the pixel from the image memory 21 with the threshold value from the SPM 23, and when the value of the pixel is larger than the threshold value, a signal to indicate that writing should be performed on the position of the pixel is generated.

If the original image is a multicolor image, a color component specifying signal 81 is inputted to the image memory 21, the SPM 23 and the channel switching part 120a of the recording mechanism 120 and the operation of the recording mechanism 120 in this case will be discussed later.

Next, discussion will be made on an operation of the image recording system 1 for generating a halftone dot image representing a grayscale original image. In generation of the halftone dot image by the image recording system 1, first, the computer 11 generates the threshold matrix 710 used for generation of the halftone dot image.

Figure 4:
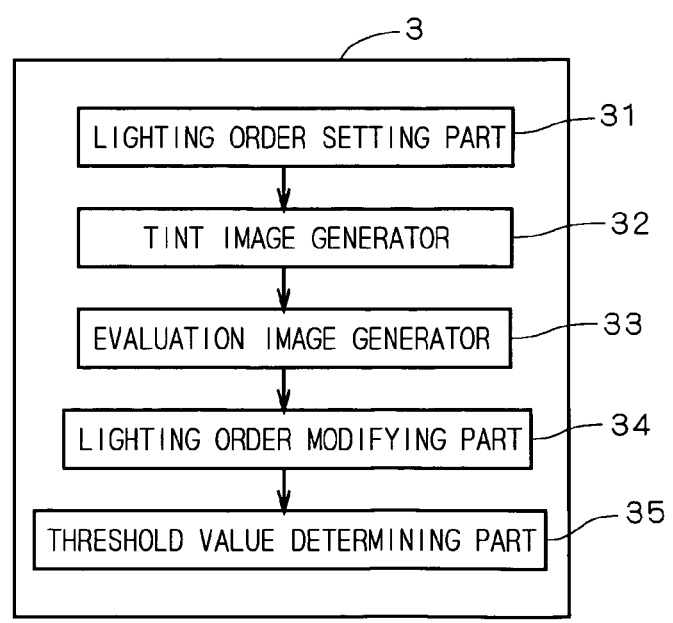
FIG. 4 is a block diagram showing a structure of functions implemented by a computer.
Figure 5:
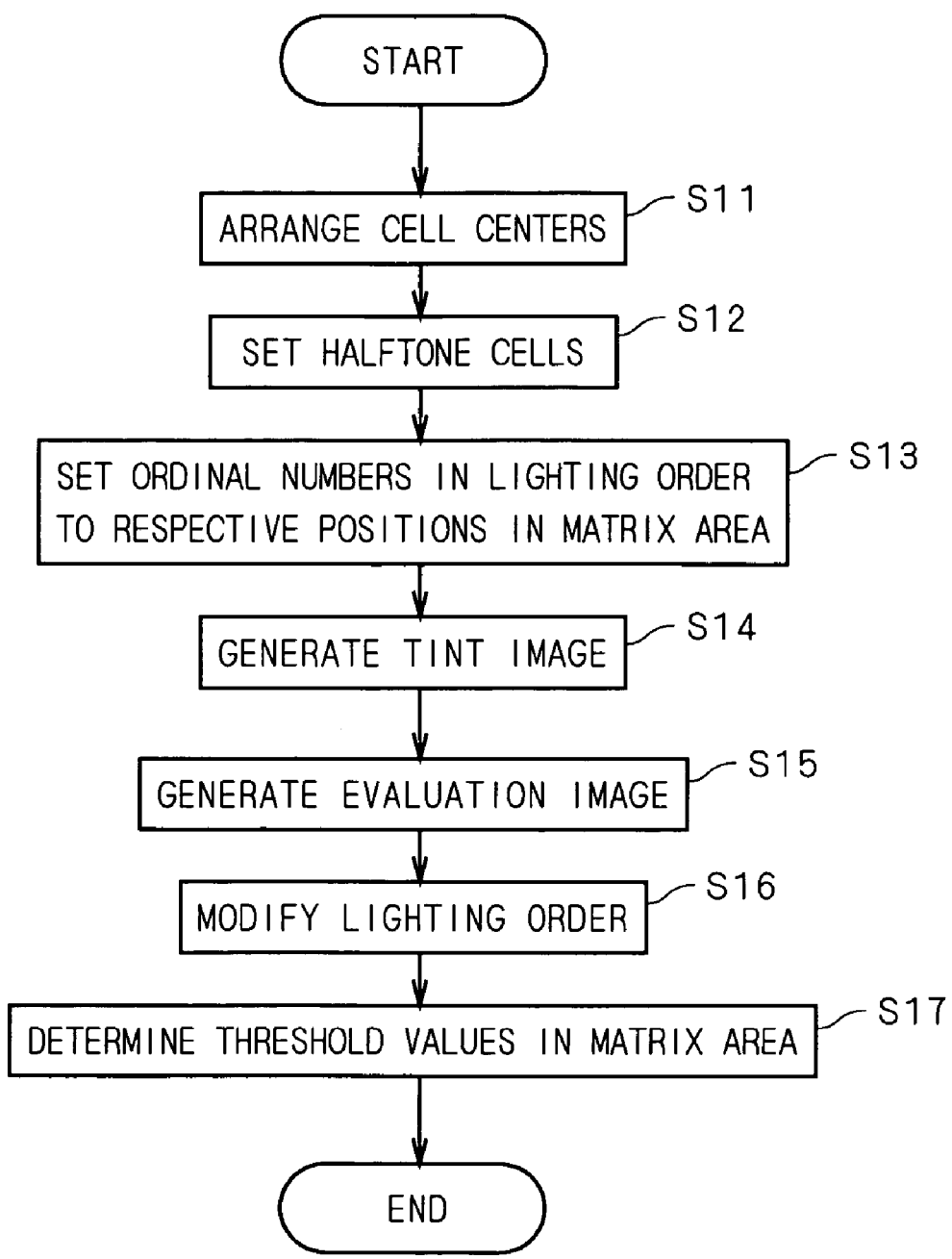
FIG. 5 is a flowchart showing an operation flow for generating the threshold matrix.

FIG. 4 is a block diagram showing a structure of functions implemented by the CPU 101, the ROM 102, the RAM 103, the fixed disk 105 and the like in an operation by the CPU 101 according to the program 92 and FIG. 5 is a flowchart showing an operation flow of the computer 11 for generating the threshold matrix 710. In FIG. 4, the threshold matrix generation part 3 (a lighting order setting part 31, a tint image generator 32, an evaluation image generator 33, a lighting order modifying part 34 and a threshold value determining part 35) is functions implemented by the CPU 101 and the like. These functions of the threshold matrix generation part 3 may be implemented by dedicated electric circuits, or may be partially implemented by the dedicated electric circuits.

Figure 6:
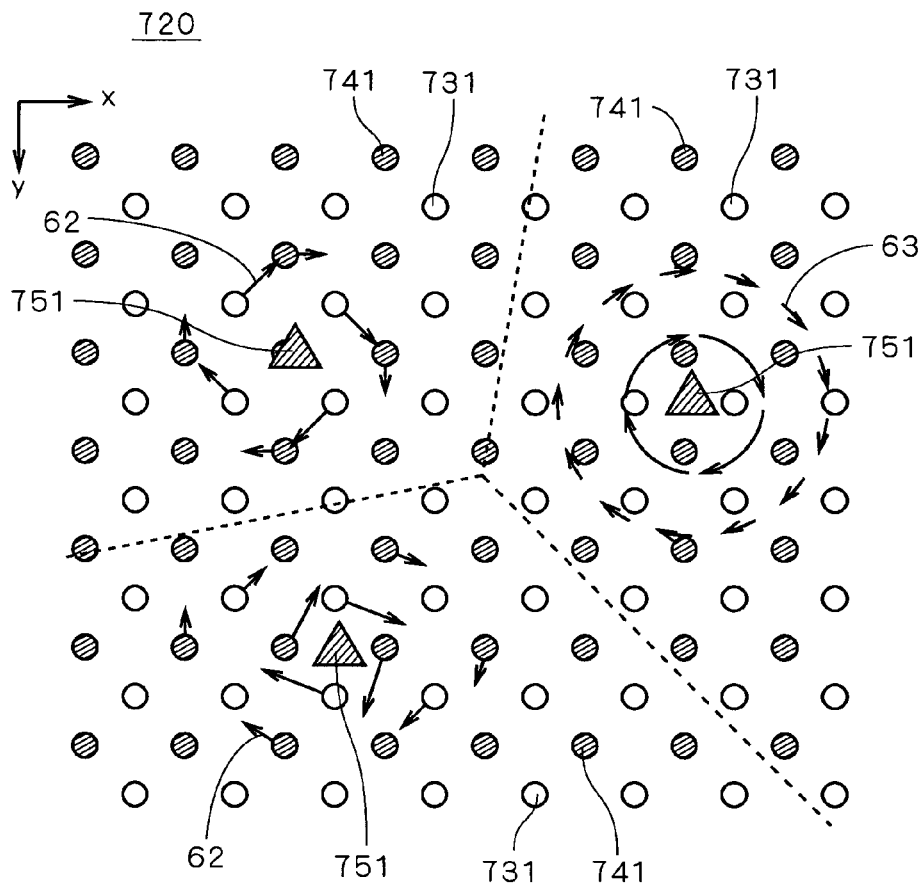
FIG. 6 is a view showing a state where reference points are superimposed on cell centers arranged in the matrix area.

In generation of the threshold matrix 710, first, the lighting order setting part 31 of the threshold matrix generation part 3 sets a matrix area for storing the threshold matrix 710 and centers of halftone cells (each of which corresponds to the almost central position of a halftone dot area used to represent the halftone dot image and hereinafter referred to as "cell center") are regularly arranged. Each halftone cell serves as a unit of an area for forming the halftone dots. In the case of this preferred embodiment, highlight-side dot cells in each of which a dot-like halftone dot area is changed in response to change in the highlight side gray level of the original image and shadow-side dot cells in each of which a ring-like halftone dot area is changed in response to change in the shadow side gray level are provided, and as shown in FIG. 6, a plurality of highlight-side cell centers 731 and a plurality of shadow-side cell centers 741 are regularly arranged in row and column directions at the same pitch in the matrix area 720.

Subsequently, reference points 751 the number of which is fairly smaller than that of the cell centers 731 and 741 are arranged in the matrix area 720 almost uniformly in a random fashion by a predetermined method. At this time, since the matrix area 720 corresponds to the repeat area 71 shown in FIG. 3, each reference point 751 is thought to be repeated both in the horizontal and vertical directions. The nearest reference point 751 is specified for each cell center included in the plurality of highlight-side cell centers 731 and the plurality of shadow-side cell centers 741 in consideration of repeat of the matrix area 720. In FIG. 6, with respect to the cell centers 731 and 741 included in each of areas which are partitioned by broken lines, the reference point 751 included in the same area is specified as the nearest one, and each area may be thought as a territory of the reference point 751 included in the area.

The computer 11 calculates the distance between each of the cell centers 731 and 741 and the nearest reference point 751 (in consideration of repeat of the matrix area 720). Then, a rotation angle with respect to each of the cell centers 731 and 741 is obtained by a predetermined calculation, and the cell centers 731 and 741 are rotated around the nearest reference point 751 in the same rotation direction. At this time, the rotation angle with respect to each of the cell centers 731 and 741 becomes smaller as the distance between the cell center 731 or 741 and the nearest reference point 751 becomes longer. In the upper left and lower left areas of FIG. 6, shorter arrows 62 which are farther from the reference point 751 indicate that the rotation angle with respect to each of the cell centers 731 and 741 becomes smaller as the distance between the cell center and the nearest reference point 751 becomes longer. In the upper right area, arrows 63 conceptually indicate that the rotation angle of each cell center becomes smaller as the distance between the cell center and the reference point 751 becomes longer.

Figure 7:
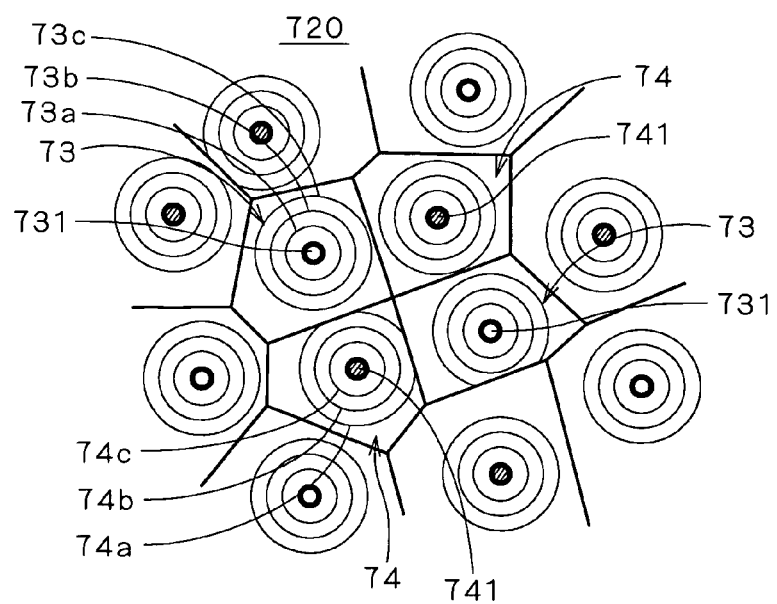
FIG. 7 is a view showing a state where halftone cells are set.

Subsequently, uniformity in distribution of the plurality of highlight-side cell centers 731 and the plurality of shadow-side cell centers 741 in the matrix area 720 is improved by using a Voronoi tessellation when necessary. By the above operation, the setting of the cell centers 731 and 741 which are arranged almost uniformly in a random fashion in the matrix area 720 is completed (Step S11). After the cell centers 731 and 741 which are distributed almost uniformly are set, threshold values are determined for the matrix area 720. In determining the threshold values, first, halftone cells each serving as a unit for creation of halftone dots are set around each of the cell centers 731 and 741 (Step S12). FIG. 7 is a view showing a state where polygonal halftone cells 73 and 74 are set around the cell centers 731 and 741, respectively, and a highlight-side halftone cell 73 corresponds to the highlight-side cell center 731 and a shadow-side halftone cell 74 corresponds to the shadow-side cell center 741. The halftone cells 73 and 74 are set in the matrix area 720 in consideration of repeat of the matrix area 720 both in the horizontal and vertical directions.

The setting of the halftone cells is performed, for example, in the following manner. First, in order to determine which one of the cell centers 731 and 741 a position in the matrix area 720 belongs to, the square of the distance between the position and each of the cell centers 731 and 741 is obtained as an evaluation value. In calculation of the evaluation value for one cell center 731 or 741 (hereinafter, referred to as "specified cell center"), one out of a plurality of specified dot centers in consideration of repeat of the matrix area 720 both in the horizontal and vertical directions, which is closest to the specified position, is selected as an object for calculation of the evaluation value. Then, it is determined that this position should belong to the cell center 731 or 741 which has the smallest evaluation value. By performing the above calculation for all the positions, the matrix area 720 is divided into halftone cells 73 and 74 around the cell centers 731 and 741, and a plurality of halftone cells 73 and 74 are set in the matrix area 720 at random in irregular shapes, as shown in FIG. 7.

When the setting of the halftone cells 73 and 74 is completed, subsequently, a first-stage evaluation value is obtained for each of all the positions in each of the halftone cells 73 and 74. As the first-stage evaluation value, for example, used is the distance between the position and the cell center 731 or 741 of the halftone cell 73 or 74 including the position. Then, numbers of integer which increase by 1 are sequentially assigned to all the positions in each halftone cell 73 or 74, from one having the smallest first-stage evaluation value, and the number is divided by the total number of positions constituting the halftone cell 73 or 74, to obtain a second-stage evaluation value (ranging from 0.0 to 1.0) which is normalized by the size of the halftone cell, which is now assigned. This allows a smaller evaluation value to be assigned to a position closer to the cell center 731 or 741.

Figure 8:
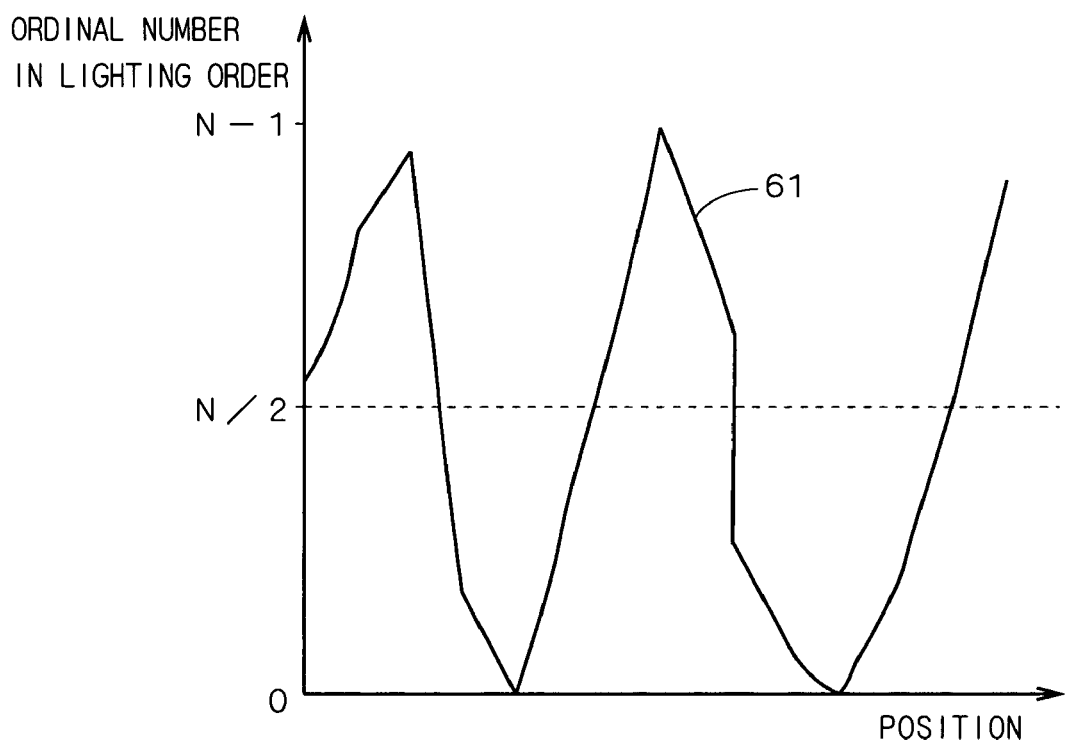
FIG. 8 is a graph illustrating ordinal numbers in lighting order of respective positions arranged in the matrix area.

Next, with respect to each of the shadow-side halftone cells 74, the second-stage evaluation value is changed to a value obtained by subtracting the second-stage evaluation value from 2. This gives evaluation values each ranging from 2.0 to 1.0 to the positions of the shadow-side halftone cells 74, and the second-stage evaluation value becomes larger as the position is closer to the shadow-side cell center 741. Then, numbers of integer which increase by 1 are sequentially assigned to all the positions in the matrix area 720, whereby ordinal numbers in lighting order are set to respective positions in the matrix area 720 (Step S13). The lighting order indicates an order for including pixels in a halftone dot image in the halftone dot areas with increase of gray level of original image. In the matrix area 720 where the lighting order is set, when the total number of positions is N, the ordinal numbers in the lighting order ranging from 0 to (N−1) are assigned to respective positions, ordinal numbers in lighting order of respective positions arranged in a certain direction straightly in the matrix area 720 are illustrated by a line 61 of FIG. 8.

FIG. 7 which shows the halftone cells 73 and 74 in the matrix area 720 also illustrates change in size of respective halftone dot areas to be formed in the halftone cell 73 and 74 with change in the gray level of the original image. In the highlight-side halftone cells 73 as shown in lines 73a to 73c, the halftone dot area (dot) grows from the center toward a peripheral portion according to increase in the highlight-side gray level of the original image, and in the shadow-side halftone cells 74 as shown in lines 74a to 74c, the halftone dot area grows from a peripheral portion toward the center according to increase in the shadow-side gray level (the blank dot deflates). In FIG. 7, since the first-stage evaluation value for each position is obtained as the distance between the position and the cell center 731 or 741, the boundary of each halftone dot area has a (perfect) circular shape as indicated by the lines 73a to 73c or 74a to 74c. With respect to respective halftone cells 73 and 74, since the halftone dot areas do not become larger than the corresponding halftone cells 73 and 74, the halftone dot areas in the matrix area 720 vary with change in gray level in accordance with shapes of the halftone cells 73 and 74.

Figure 9:
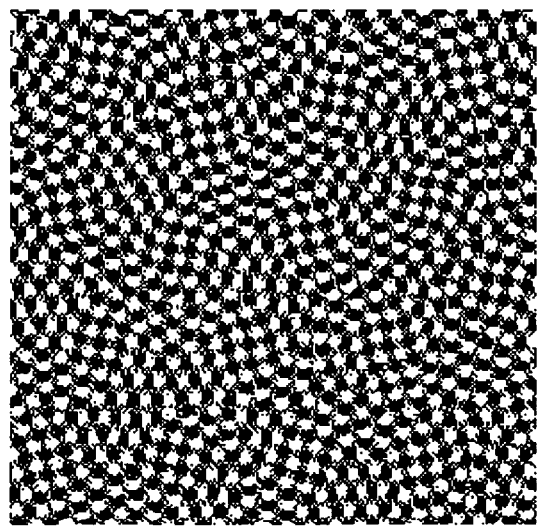
FIG. 9 is a view showing a grayscale image.
Figure 10:
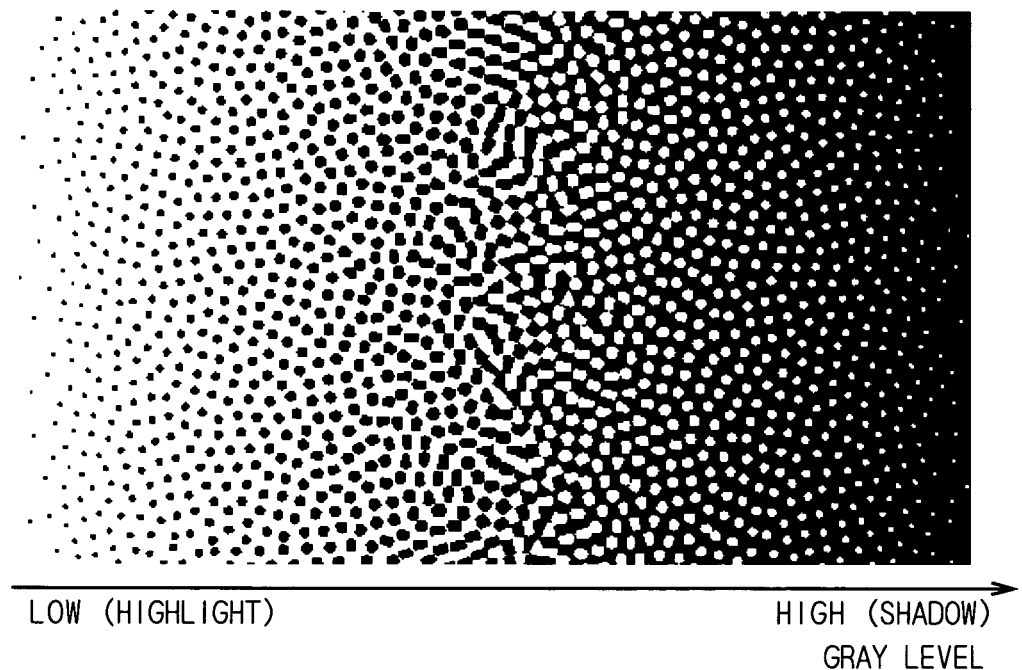
FIG. 10 is a view showing a halftone dot image where a gradation image is represented by halftone dots.

If reduction of gray levels (i.e., reduction of ordinal numbers) is performed on the lighting order set to the matrix area 720 (in the course of generation of the threshold matrix 710) in accordance with the number of gray levels in screening (equal to the number of gray levels in the original image in this preferred embodiment) in a method described later, a threshold value is assigned to each position, and a threshold matrix corresponding to the matrix area 720 is generated. When each position in the threshold matrix is regarded as a pixel and the threshold value assigned to the position is regarded as a value of the pixel, the threshold matrix is represented as a gray scale image shown in FIG. 9. When an image where gray levels (values of pixels) in a column direction are constant and gray levels in a row direction change linearly, for example, from 0 to 255 (so-called gradation image) is processed with the threshold matrix to be represented by halftone dots, a halftone dot image shown in FIG. 10 is obtained. Partially referring to the halftone dot image of FIG. 10 in accordance with gray level, it is seen that connecting of dots (one dot corresponds to one solid area in a range of low gray levels in FIG. 10) in halftone dot areas generated in highlight-side halftone cells begins at a certain gray level locally, the connecting gradually spreads in all the highlight-side halftone cells, further the connecting of the dots continue through halftone dot areas included in shadow-side halftone cells, and finally the connecting of the dots is completed in another gray level (i.e., all blank dots are isolated completely, and the halftone dot areas represent a mesh-like writing area in this state).

As described above, in Step S13 of FIG. 5, the ordinal numbers in the lighting order are set to respective positions in the matrix area 720 so that the connecting of the dots of the halftone dot areas occurs at random with increase of gray level within a predetermined range from one gray level to the other gray level (a range in which the center value is almost median gray level where tone value (proportion of halftone dot area(s) in a unit area) becomes 50%, this range is hereinafter referred to as "connecting occurrence range").

Figure 11:
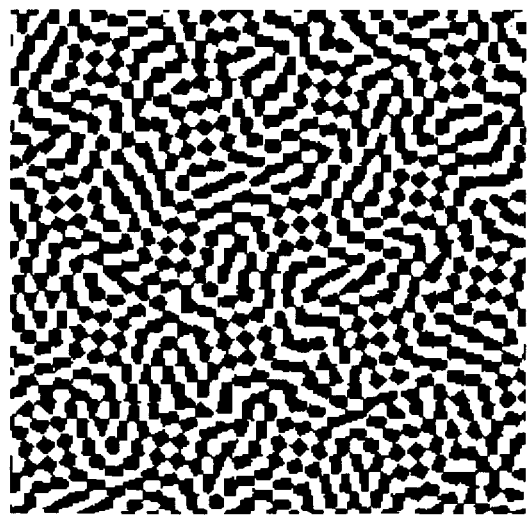
FIG. 11 is a view showing a tint image.

The tint image generator 32 generates a binary tint image shown in FIG. 11 (Step S14), where each position in the matrix area 720 of which an ordinal number in lighting order is smaller than (N/2) (i.e., smaller than a median value in the lighting order) is regarded as a pixel of value "0" and each position of which an ordinal number is equal to or greater than (N/2) is regarded as a pixel of value "255". This process corresponds to executing a program written in (if (ordinal number<(N/2)) then value of pixel=0; else value of pixel=255), for example. In FIG. 11, black areas correspond to pixels of value "0" and white areas correspond to those of value "255". Generation of the tint image in Step S14 is slightly different from normal generation of a tint image, where the threshold matrix is used. The median value (N/2) in the lighting order corresponds to a median gray level in screening, and tone value of the tint image in FIG. 11 is 50%, but gray level for generation of the tint image may be other than the median gray level if the gray level is included in the connecting occurrence range. In other words, the tint image generator 32 binarizes the ordinal numbers in the matrix area 720 on the basis of a specified gray level within the connecting occurrence range, to generate the tint image corresponding to the matrix area 720. The value of each pixel in the tint image may be 0 or 63, 0 or 4095 or the like, other than 0 or 255.

Figure 12:
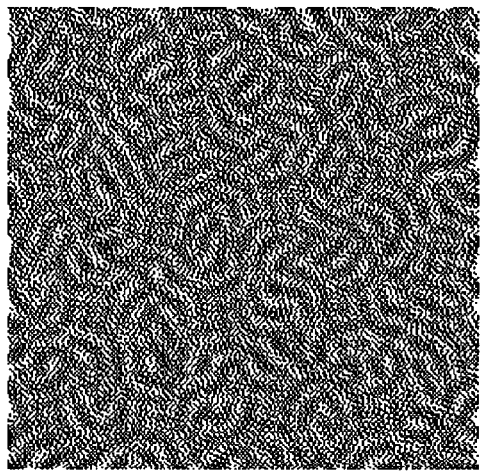
FIG. 12 is a view showing an evaluation image.

After generation of the tint image, the evaluation image generator 33 prepares a moving average filter where a size with respect to each of the row and column directions of the matrix area 720 is made the same as an average distance between the centers of the dots generated in the halftone dot areas in the highlight-side gray level (i.e., average distance between the highlight-side cell centers 731 after the operation by the lighting order setting part 31). A smoothing operation is performed on the tint image by using the moving average filter to generate a grayscale image (hereinafter, referred to as "evaluation image") shown in FIG. 12 (Step S15). In the evaluation image shown in FIG. 12, distribution of density which has the same features as distribution of the halftone dot areas (the black areas of FIG. 11) in the tint image of FIG. 11 remains, a halftone structure of the tint image is almost maintained, and components indicating unevenness of the distribution of the halftone dot areas are also present.

After generation of the evaluation image, the lighting order modifying part 34 modifies the lighting order by changing the ordinal numbers of respective positions in the matrix area 720 on the basis of values of corresponding pixels in the evaluation image (Step S16). Specifically, first, a value (here any value ranging from 0 to 255) of each pixel in the evaluation image are scaled discretely to any value ranging from 0 to (N−1) in accordance with the number of pixels and expanded, and a scaled value is regarded as a tone evaluation value. At this time, an average value of the tone evaluation values in the evaluation image becomes (N/2), areas with relatively low density (white areas in macro) in the evaluation image shown in FIG. 12 include many pixels having the tone evaluation value greater than the average value (N/2), and areas with relatively high density (black areas in macro) include many pixels having the tone evaluation value smaller than the average value (N/2). Subsequently, a modified evaluation value $C_i$ is obtained by computation of Eq. 1 where $A_i$ is an ordinal number in lighting order of each position i in the matrix area 720, $B_i$ is a tone evaluation value of a corresponding pixel in an evaluation image, and (N/2) is a median value in lighting order. In Eq. 1, (abs ($\alpha$)) represents an absolute value of $\alpha$, and $D_i$ represents a gray level dependent coefficient.

$$C_i = A_i - (B_i - N/2)*D_i \quad \text{Eq. 1}$$

where $D_i = 1.0 - \text{abs}(A_i - N/2)/(N/2)$

Then, changed ordinal numbers which are numbers of integer increasing by 1 are sequentially assigned to respective positions in matrix area 720, from one having the smallest modified evaluation value. Thus, the lighting order modifying part 34 assigns modified evaluation values smaller than the original ordinal numbers to most positions in the matrix area 720 corresponding to the areas with low density in the evaluation image shown in FIG. 12 and makes a change where the ordinal numbers in the lighting order of the positions are made low. On the other hand, the lighting order modifying part 34 assigns modified evaluation values greater than the original ordinal numbers to most positions in the matrix area 720 corresponding to the areas with high density in the evaluation image and makes a change where the ordinal numbers in the lighting order of the positions are made high.

Next, with respect to areas in the matrix area 720 which correspond to areas around boundaries of halftone dot areas in the tint image (for example, clusters of pixels newly included in the halftone dot areas in increasing gray level within the connecting occurrence range, hereinafter, these areas in the matrix area 720 are referred to as "specified areas", and corresponding areas in other images are also called the specified areas), since the gray level dependent coefficient $D_i$ of Eq. 1 is a function where an output value becomes greater as an ordinal number $A_i$ in lighting order which is inputted becomes close to the median value (N/2) in the lighting order, degree of change of the ordinal number on each position included in the specified areas is magnified. On the other hand, since the gray level dependent coefficient $D_i$ becomes small in positions away from the specified areas in the matrix area 720, the degree of the change of the ordinal number becomes slight. Other functions may be used as the gray level dependent coefficient of Eq. 1, if which outputs a greater value as the ordinal number which is inputted becomes close to the median value in the lighting order (the same as the following description). Instead of the gray level dependent coefficient, may be used a function where an output value becomes "1" within a range of ordinal numbers in lighting order corresponding to a range of tone values 30% to 70% and an output value becomes "0" within the other range, for example.

Figure 13:
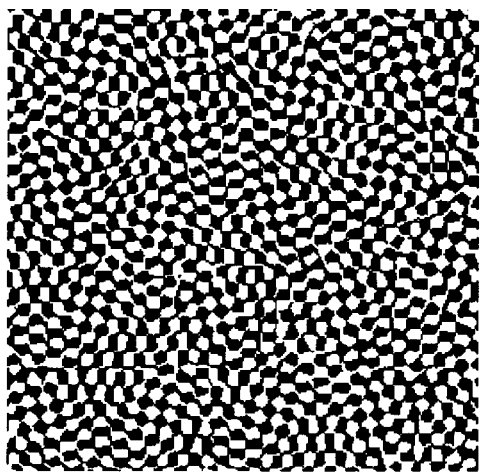
FIG. 13 is a view showing a tint image.
Figure 14:
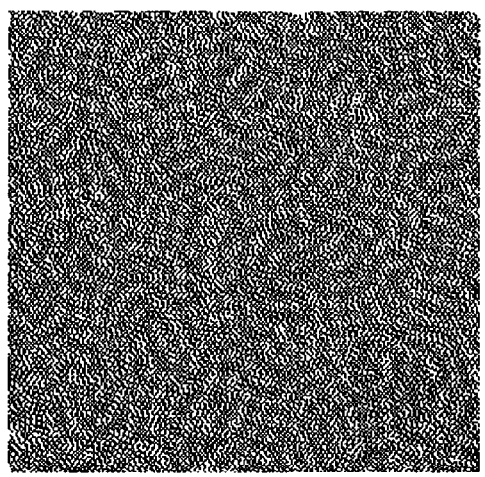
FIG. 14 is a view showing a grayscale image.

If, as with the operation in Step S14 of FIG. 5, in the matrix area 720, each position of which ordinal number in lighting order is smaller than the median value (N/2) is regarded as a pixel of value "0" and each position of which ordinal number is equal to or greater than (N/2) is regarded as a pixel of value "255", a binary tint image corresponding to the matrix area 720 having modified lighting order is generated. FIG. 13 is a view showing the tint image. Also in FIG. 13, black areas correspond to pixels of value "0". Further, when the smoothing operation which is the same operation in Step S15 is performed on the tint image of FIG. 13, a grayscale image shown in FIG. 14 is generated. Then comparing the evaluation image of FIG. 12 (i.e., the image obtained by performing the smoothing operation on the tint image in the specified gray level which is generated in accordance with lighting order before modification) with the grayscale image of FIG. 14, in at least the specified areas, a variation among values of pixels in the image of FIG. 14 is smaller than that in the evaluation image of FIG. 12. A type or size of a filter used in performing the smoothing operation is changed when necessary, the operations in Steps S14 to S16 are repeated on the matrix area 720 with modified lighting order, and then the ordinal numbers in the lighting order of respective positions in the matrix area 720 may be changed to more preferable ones.

After acquisition of the modified lighting order, the threshold value determining part 35 performs reduction of gray levels (ordinal numbers) of the modified lighting order in accordance with the number of gray levels in screening (equal to the number of gray levels in the original image in this preferred embodiment). The technique for the reduction of gray levels is that where the total number of positions in the matrix area 720 is, for example, N and the number of gray levels in the original image is M (here, 256 (=8 bit)), ordinal numbers (0 to (N−1)) in the modified lighting order assigned to respective positions are multiplied by ((M−1)/(N−1)), and threshold values ranging from 0 to (M−1) are assigned to respective positions. In this manner, final threshold values are determined with reflecting the modified lighting order, and the threshold matrix 710 (refer to FIG. 1) corresponding to the matrix area 720 is generated (Step S17).

When generation of the threshold matrix 710 is completed by the computer 11, the threshold matrix 710 and the data of the original image stored in the image memory 104 are transmitted to the image recording apparatus 12 through the communication part 109 and stored into the SPM 23 and the image memory 21 shown in FIG. 2, respectively, as discussed earlier. With this operation, a group of threshold values corresponding to the growth of the halftone dot areas of halftone cells 73 are set in a storage area having the same size as the matrix area 720 in the SPM 23. Then, the value of each pixel in the original image stored in the image memory 21 and the corresponding threshold value in the threshold matrix 710 in the SPM 23 are inputted to the comparator 25, the signal generation circuit 123 in the image recording apparatus 12 generates a signal of halftone dot image and the writing head 122 records the halftone dot image. Specifically, when the value of the pixel in the original image is larger than the threshold value, light is emitted to a position of the printing plate 8 corresponding to the pixel by the recording mechanism 120, to thereby perform writing.

Though the operation for generation of the halftone dot image have been discussed above, the lighting order modifying part 34 in generating the threshold matrix 710 obtains the modified evaluation value Ci by computation of Eq. 2 or 3 instead of Eq. 1, and the modified lighting order may be acquired. In Eqs. 2 and 3, Ai is the ordinal number in the lighting order of each position i in the matrix area 720, Bi is the tone evaluation value of the corresponding pixel in the evaluation image, (N/2) is the median value in the lighting order, (abs (α)) represents the absolute value of α, Di represents the gray level dependent coefficient, and Ei represents a tone correction coefficient. An average value of tone correction coefficients becomes 1, the areas with relatively low density in the evaluation image (i.e., areas having a value greater than (N/2)) include many pixels where the corresponding tone correction coefficients are greater than 1, and the areas with relatively high density include many pixels where the corresponding tone correction coefficients are smaller than 1. With this operation, in the tint image on which the smoothing operation is performed, the lighting order is modified so that unevenness of density in the specified areas is reduced, as in Eq. 1.

$$Ci=Ai*(1.0-(Ei-1.0)*Di) \quad \text{Eq. 2}$$

where $Di=1.0-abs(Ai-N/2)/(N/2)$ and $Ei=Bi/(N/2)$ $$Ci=Ai/(1.0+(Ei-1.0)*Di) \quad \text{Eq. 3}$$

where $Di=1.0-abs(Ai-N/2)/(N/2)$ and $Ei=Bi/(N/2)$

Instead of the gray level dependent coefficient used in Eqs. 2 and 3, may be used a function where an output value becomes "1" within a range of ordinal numbers in lighting order corresponding to a range of tone values 40% to 60% and an output value becomes "0" within other range, for example.

As discussed above, in the computer 11, the tint image in the specified gray level is generated from temporary lighting order set in the matrix area 720, the smoothing operation is performed on the tint image by using the predetermined filter, to generate the grayscale evaluation image. Then, the ordinal numbers in the lighting order of respective positions in the matrix area 720 are modified on the basis of the values of the corresponding pixels in the evaluation image by the predetermined computation. A variation among the values of the pixels included in the specified areas in the grayscale image which is generated by performing Steps S14 and S15 on the ordinal numbers in the modified lighting order becomes smaller than a variation among the values of the pixels included in the specified areas in the grayscale image which is generated by performing Steps S14 and S15 on the ordinal numbers in the lighting order which is set in Step S13 (that is, a variation among the values of the pixels included in the specified areas in the image which is generated by performing the smoothing operation on the tint image in the specified gray level generated in accordance with the modified lighting order becomes smaller than a variation among the values of the pixels included in the specified areas in the image which is generated by performing the same smoothing operation on the tint image in the same gray level generated in accordance with the lighting order which is set by the lighting order setting part 31). Reduction of unevenness in the above tint image is equivalent to reduction of unevenness in the actual halftone dot image generated by using threshold matrix 710, and thus by the above operation, it becomes possible to generate the threshold matrix 710 which is possible to reduce the unevenness in the gray levels around the median value and suppress graininess in the generated halftone dot image, while suppressing moire or tone jump from arising.

In the evaluation image in a case that the halftone structure of the tint image is maintained, it may be expected that the values of the pixels in the evaluation image corresponding to the positions away from the specified areas in the matrix area 720 are extremely high or low, and it is not preferable to modify the lighting order excessively on the basis of such values. From the viewpoint of suppressing graininess in the halftone dot image, it is sufficient to only change the ordinal numbers in the lighting order of the positions included in at least the specified areas in matrix area 720 on the basis of the values of the corresponding pixels in the evaluation image. Conversely, in the lighting order modifying part 34, since degree of change of the ordinal numbers on the positions away from the specified areas is reduced by using the gray level dependent coefficient Di and the ordinal numbers of respective positions included in the specified areas are modified efficiently, the ordinal numbers in the lighting order of respective positions in matrix area 720 can be changed appropriately (i.e., the lighting order can be modified appropriately).

Also in the threshold matrix 710 obtained in the process of FIG. 5, threshold values which are half or less than half of the maximum gray level are given to most positions in the highlight-side halftone cells 73 and threshold values which are half or more than half of the maximum gray level are given to most positions in the shadow-side halftone cells 74. Thus, with the gray level of 50% in the original image as a border, the variation of halftone dot areas in the highlight-side halftone cells and the variation of halftone dot areas in the shadow-side halftone cells in response to change in gray level are switched, and this allows the variation characteristic of the halftone dots in accordance with change in gray level of the original image to be almost symmetric on the highlight side and the shadow side and preferable halftone dots can be thereby formed.

There may be a case where data of the generated threshold matrix 710 is written into a recording medium 91*b* by the reader/writer 108 of the computer 11, the recording medium 91*b* is carried to other places and a computer in some other image recording system reads the data stored in the recording medium 91*b*, to generate a halftone dot image. Further, the recording medium 91*b* storing the data of the threshold matrix 710 may be distributed and this allows generation of a halftone dot image with less graininess by using a general-purpose computer in various places. The data of the threshold matrix 710 may be distributed through other recording mediums on the internet, of course.

If the original image is a grayscale color image, the original image is stored in the image memory 21 for each color component and the threshold matrix is stored in the SPM 23 for each color component. Then, as shown in FIG. 2, the color component specifying signal 81 is inputted to the image memory 21, the SPM 23 and a channel switching part 120*a* of the recording mechanism 120, and in response to switching of the color component specifying signal 81, the halftone dot image of each color component (color separation) is recorded in a halftone dot recording medium.

A different threshold matrix is prepared for each color component. For example, by shifting the positions of the cell centers 731 and 741 which are originally arranged in a regular form or changing the positions of the reference points which are originally set by the lighting order setting part 31, the shapes of the halftone cells set in the matrix area 720 are made different for each color component, and then the lighting order is modified. By randomly changing the threshold matrix for each color component, it is possible to suppress overlapping moire.

Next discussion will be made on another process in the threshold matrix generation part 3 as the second preferred embodiment. In this process, only the operations in Steps S15 and S16 of FIG. 5 differ from the operations of the first preferred embodiment. After a tint image in the specified gray level is generated by the tint image generator 32 (FIG. 5: Step S14), the smoothing operation is performed on the tint image until a halftone structure is removed, to generate a grayscale evaluation image (Step S15).

As the smoothing operation here, the method disclosed in the above-described Document 3 (Japanese Patent Publication No. 3481423) can be utilized, and the disclosure of which is herein incorporated by reference. Specifically, a gaussian filter of which size is made 4.25 times an average distance between the centers of dots generated in halftone dot areas in highlight-side gray level, with respect to each of row and column directions of matrix area, is used and the smoothing operation is performed on the tint image. This allows to remove the halftone structure from the tint image and extract slight differences of density indicating unevenness in distribution of dots.

Then, each values ranging from 0 to 255 are scaled discretely to any value ranging from 0 to (N−1) in accordance with the number of pixels (the total number of positions in the matrix area), and a converted value by scaling of each pixel in the evaluation image is regarded as a tone evaluation value. At this time, an average value of tone evaluation values in the evaluation image becomes (N/2), tone evaluation values of most pixels included in areas with relatively low density in the evaluation image are slightly higher than the average value (N/2), tone evaluation values of most pixels included in areas with relatively high density are slightly lower than the average value (N/2), and a difference between the maximum value and the minimum value of the tone evaluation value is smaller than a difference in the above-described evaluation image where the halftone structure is almost maintained.

Subsequently, in a lighting order modifying part 34, a modified evaluation value Ci is obtained by computation of Eq. 4 and a modified lighting order is acquired, where Ai is an ordinal number in lighting order of each position i in the matrix area and Bi is a tone evaluation value of a corresponding pixel in an evaluation image (Step S16).

$$Ci = Ai - Bi \qquad \text{Eq. 4}$$

In Eq. 4, the tone evaluation value Bi of the corresponding pixel in the evaluation image is subtracted from the ordinal number Ai in the lighting order of each position i in the matrix area, the modified evaluation value Ci is obtained, and thus the lighting order can be modified easily. With this operation, a variation among the values of the pixels included in the image which is generated by performing the smoothing operation on the tint image in the specified gray level generated in accordance with the modified lighting order becomes smaller than a variation among the values of the pixels included in the image which is generated by performing the same smoothing operation on a tint image in the same gray level generated in accordance with the unmodified lighting order (lighting order before modification) which is set by the lighting order setting part 31. In this operation, since in the evaluation image the halftone structure of the tint image is removed and the values of the pixels corresponding to the positions away from the specified areas in the matrix area are not made extremely high or low, a gray level dependent coefficient is omitted in Eq. 4. Then, threshold values are determined with reflecting the modified lighting order, to generate a threshold matrix 710 (Step S17).

As discussed above, in the operation in accordance with the second preferred embodiment, the halftone structure is removed from the tint image by the smoothing operation in the tint image generator 32, to generate the grayscale evaluation image. Then, the ordinal numbers of respective positions in the matrix area are changed on the basis of the values of the corresponding pixels in the evaluation image by the predetermined computation, so that in areas in the matrix area corresponding to areas with relatively low density in the evaluation image, ordinal numbers in lighting order of respective positions included in these areas in the matrix area become low and in areas in the matrix area corresponding to areas with relatively high density in the evaluation image, ordinal numbers in lighting order of respective positions included in these areas in the matrix area become high. This makes it possible to generate the threshold matrix 710 which is possible to suppress graininess (especially in median gray levels) in a generated halftone dot image. Also in the threshold matrix generated in this operation, there may be a case where data of the generated threshold matrix 710 is written into a recording medium 91b, to generate a halftone dot image in some other image recording system or the like.

In a lighting order modifying part 34 in accordance with this operation, a modified evaluation value Ci may be obtained by computation of Eq. 5 or 6, where Ai is an ordinal number in lighting order of each position i in the matrix area, Bi is a tone evaluation value of a corresponding pixel in an evaluation image, and (N/2) is a median value in lighting order. In Eq. 6, Ei represents a tone correction coefficient, and a calculation is used where the ordinal number Ai in the lighting order is divided by the tone evaluation value Bi.

$$Ci = Ai - (Bi - N/2) \qquad \text{Eq. 5}$$

$$Ci = Ai/Ei \qquad \text{Eq. 6}$$

where Ei=Bi/(N/2)

In a case where any of Eqs. 4 to 6 is used in changing the ordinal number of each position in the matrix area, after scaling the corresponding pixel in the evaluation image, a calculation where the ordinal number in the lighting order is divided by the tone evaluation value, or a calculation where the tone evaluation value is subtracted from the ordinal number in the lighting order is at least performed, and this allows appropriate change of the ordinal numbers in the lighting order (i.e., appropriate modification of the lighting order) in which the variation among the values of the pixels included in the image which is generated by performing the smoothing operation on the tint image in the specified gray level generated in accordance with the modified lighting order becomes smaller than the variation among the values of the pixels included in the image which is generated by performing the same smoothing operation on the tint image in the same gray level generated in accordance with the lighting order before modification. In generation of the evaluation image by removing the halftone structure from the tint image, from the viewpoint of changing the ordinal number of each position in the matrix area appropriately, it is not necessary to obtain the tone evaluation values by scaling the values of pixels in the evaluation image, and a calculation where the ordinal number in the lighting order of each position in the matrix area is divided by the value of the corresponding pixel in the evaluation image, or a calculation where the value of the corresponding pixel in the evaluation image is subtracted from the ordinal number of each position is only included substantially in the operation of the lighting order modifying part 34. Computations by Eqs. 4 to 6 also substantially include the calculation where the ordinal number of each position in the matrix area is divided by the value of the corresponding pixel in the evaluation image, or the calculation where the value of the corresponding pixel in the evaluation image is subtracted from the ordinal number of each position.

A modified evaluation value Ci may be obtained by computation of Eq. 7 including a multiplication, where Ai is an ordinal number in lighting order of each position i in the matrix area, Bi is a tone evaluation value of a corresponding pixel in an evaluation image, and (N/2) is a median value in lighting order. In Eq. 7, Ei represents a tone correction coefficient.

$$Ci=Ai*(2.0-Ei) \qquad \text{Eq. 7}$$

where Ei=Bi/(N/2)

Also in this operation where the halftone structure is removed from the tint image, the modified evaluation value may be obtained by the computation using the gray level dependent coefficient such as the above-described Eqs. 1 to 3, and further as in the above description, instead of the gray level dependent coefficient, may be used a function where an output value becomes "1" within a range of ordinal numbers in lighting order corresponding to a predetermined range of tone values and an output value becomes "0" within other range.

Though the preferred embodiments of the present invention have been discussed above, the present invention is not limited to the above-discussed preferred embodiments, but allows various variations.

In the above preferred embodiments, in the lighting order setting part 31, the plurality of highlight-side halftone cells in each of which the halftone dot area grows according to increase in the highlight-side gray level and the plurality of shadow-side halftone cells in each of which the halftone dot area grows according to increase in the shadow-side gray level are set in the matrix area and the ordinal numbers in the lighting order of respective positions are set. However, one kind of a plurality of halftone cells in each of which a halftone dot area(s) grows according to increase in the whole range of gray levels are set in the matrix area, and ordinal numbers in lighting order of respective positions may be set so that the halftone dot areas vary with change in gray level in accordance with shapes of respective halftone cells, and connecting of dots of the halftone dot areas occurs at random within a connecting occurrence range. In the course of generation of the threshold matrix, the halftone cells need not to exist clearly, and as a result of setting of threshold values not using halftone cells, areas corresponding to the halftone cells may emerge. Also, if ordinal numbers in a lighting order are set so that the connecting of dots in halftone dot areas occurs at random within the predetermined range of gray level, setting of the halftone cells may be omitted.

In the lighting order setting part 31, the unmodified lighting order may be set in the matrix area by using another method differing from the above method. For example, each of a plurality of highlight-side cell centers and a plurality of shadow-side cell centers are regularly arranged in the matrix area such that a pitch in the column direction is longer than that in the row direction, and after setting of reference points, each cell center is rotated around the nearest reference point. Then, ordinal numbers in lighting order are set in respective positions in the matrix area so that the boundary of each halftone dot area represents a shape which is longer in the column direction than in the row direction, and further ordinal numbers in respective halftone cells are determined so that the boundary of the halftone dot area maintains a long ellipse in the column direction.

According to still another method in the lighting order setting part 31, first, a plurality of highlight-side cell centers are arranged randomly in the matrix area, after uniformity in distribution of the highlight-side cell centers is improved by using the Voronoi tessellation, and then the shadow-side cell centers are disposed in positions away from respective highlight-side cell centers in a specific direction at a constant distance. Afterward, setting of the halftone cells and setting of lighting order are performed as in the case of FIG. 7.

In the above first preferred embodiment, the smoothing operation on the tint image is performed by using the moving average filter and in the above second preferred embodiment, the smoothing operation on the tint image is performed by using the gaussian filter, but of course the halftone structure may be removed from the tint image by using a large-sized moving average filter, and also the halftone structure may be maintained in the image on which the smoothing operation is performed by using a small-sized gaussian filter. Though the filter used in the smoothing operation in the above preferred embodiments can be various sizes regardless of type of filter, taking account of the amount of computation by the computer 11, it is preferable that the size of the filter is not larger than 4.25 times the average distance between the centers of dots generated in the halftone dot areas in the highlight-side gray level, with respect to each of the row and column directions of the matrix area. In reducing the amount of computation, from the viewpoint of performing a preferable smoothing operation of a certain degree, it is preferable that the size of the filter is not smaller than one times the average distance between the centers of dots in the halftone dot areas.

Further, before performing the smoothing operation in the evaluation image generator 33, a filter representing distribution of intensity of a plurality of light beams from the writing head 122 in producing, a filter representing spread of ink on a halftone dot recording medium in a case where the image recording apparatus 12 is an ink-jet printing apparatus, or the like affects the tint image, and then a threshold matrix taking account of these influences may be generated.

In the image recording apparatus 12, if the recording stability is low in a case where writing is performed on only one pixel and not performed on the other pixels around this pixel, it is preferable that a plurality of threshold values near the highlight-side cell center 731 in a threshold matrix 710 should be so corrected as to be equal values so that the minimum dot size (minimum cluster size) should be 2×2 pixels (or 1×2 pixels).

While the invention has been shown and described in detail, the foregoing description is in all aspects illustrative and not restrictive. It is therefore understood that numerous modifications and variations can be devised without departing from the scope of the invention.

This application claims priority benefit under 35 U.S.C. Section 119 of Japanese Patent Application No. 2005-3016 filed in the Japan Patent Office on Jan. 7, 2005, the entire disclosure of which is incorporated herein by reference.

What is claimed is:

1. A threshold matrix generation method for generating a threshold matrix which is compared with a grayscale original image in generating a halftone dot image representing said original image, comprising the steps of:
    a) setting ordinal numbers in lighting order to respective positions within a matrix area in which a threshold matrix is generated so that connecting of dots of halftone dot areas occurs at random with increase of gray level within a predetermined range, said lighting order indicating an order for including pixels in said halftone dot areas with increase of gray level;
- b) binarizing said ordinal numbers in said matrix area on the basis of a specified gray level within said predetermined range of gray level to generate a tint image;
- c) generating a grayscale evaluation image by performing a smoothing operation on said tint image;
- d) modifying said lighting order by changing ordinal numbers of positions included in at least specified areas which correspond to areas around boundaries of halftone dot areas in said tint image on the basis of values of corresponding pixels in said evaluation image; and
- e) determining threshold values in said matrix area with reflecting a modified lighting order, wherein a variation among values of pixels included in said specified areas in a grayscale image which is generated by performing steps b) and c) on ordinal numbers in said modified lighting order is smaller than a variation among values of pixels included in said specified areas in a grayscale image which is generated by performing steps b) and c) on ordinal numbers in said lighting order which is set in said step a).

2. The threshold matrix generation method according to claim 1, wherein a plurality of halftone cells are set in said matrix area and ordinal numbers in lighting order are set in respective positions within said matrix area so that halftone dot areas vary with change in gray level in accordance with shapes of said plurality of halftone cells in said step a).

3. The threshold matrix generation method according to claim 2, wherein said plurality of halftone cells are set at random in irregular shapes in said matrix area in said step a).

4. The threshold matrix generation method according to claim 2, wherein a plurality of highlight-side halftone cells in each of which a halftone dot area grows from the center toward a peripheral portion according to increase in highlight-side gray level and a plurality of shadow-side halftone cells in each of which a halftone dot area grows from a peripheral portion toward the center according to increase in shadow-side gray level are included in said plurality of halftone cells.

5. The threshold matrix generation method according to claim 1, wherein a halftone structure is removed from said tint image by performing said smoothing operation in said step c), and said step d) includes a calculation where an ordinal number in said lighting order of each position included in at least said specified areas in said matrix area is divided by a value of a corresponding pixel in said evaluation image, or a calculation where said value of said corresponding pixel is subtracted from said ordinal number.

6. The threshold matrix generation method according to claim 1, wherein degree of change of an ordinal number on each position included in said specified areas is magnified by using a function where an output value becomes greater as an ordinal number which is inputted becomes close to the median value in said lighting order in said step d).

7. The threshold matrix generation method according to claim 1, wherein a size of a filter used in said smoothing operation is made not smaller than one time and not larger than 4.25 times an average distance between the centers of dots generated in halftone dot areas in highlight-side gray level, with respect to each of a row direction and a column direction of said matrix area.

8. The threshold matrix generation method according to claim 1, wherein a filter used in said smoothing operation is a moving average filter.

9. The threshold matrix generation method according to claim 1, wherein a filter used in said smoothing operation is a gaussian filter.

10. A threshold matrix generation apparatus for generating a threshold matrix which is compared with a grayscale original image in generating a halftone dot image representing said original image, comprising:
- a lighting order setting part for setting ordinal numbers in lighting order to respective positions within a matrix area in which a threshold matrix is generated so that connecting of dots of halftone dot areas occurs at random with increase of gray level within a predetermined range, said lighting order indicating an order for including pixels in said halftone dot areas with increase of gray level;
- a tint image generator for binarizing said ordinal numbers in said matrix area on the basis of a specified gray level within said predetermined range of gray level to generate a tint image;
- an evaluation image generator for generating a grayscale evaluation image by performing a smoothing operation on said tint image;
- a lighting order modifying part for modifying said lighting order by changing ordinal numbers of positions included in at least specified areas which correspond to areas around boundaries of halftone dot areas in said tint image on the basis of values of corresponding pixels in said evaluation image; and
- a threshold value determining part for determining threshold values in said matrix area with reflecting a modified lighting order, wherein a variation among values of pixels included in said specified areas in a grayscale image which is generated by performing operations in said tint image generator and said evaluation image generator on ordinal numbers in said modified lighting order is smaller than a variation among values of pixels included in said specified areas in a grayscale image which is generated by performing operations in said tint image generator and said evaluation image generator on ordinal numbers in said lighting order which is set by said lighting order setting part.

11. The threshold matrix generation apparatus according to claim 10, wherein said lighting order setting part sets a plurality of halftone cells in said matrix area and ordinal numbers in lighting order in respective positions within said matrix area so that halftone dot areas vary with change in gray level in accordance with shapes of said plurality of halftone cells.

12. The threshold matrix generation apparatus according to claim 11, wherein said lighting order setting part sets said plurality of halftone cells at random in irregular shapes in said matrix area.

13. The threshold matrix generation apparatus according to claim 11, wherein a plurality of highlight-side halftone cells in each of which a halftone dot area grows from the center toward a peripheral portion according to increase in highlight-side gray level and a plurality of shadow-side halftone cells in each of which a halftone dot area grows from a peripheral portion toward the center according to increase in shadow-side gray level are included in said plurality of halftone cells.

14. The threshold matrix generation apparatus according to claim 10, wherein
a halftone structure is removed from said tint image by performing said smoothing operation in said evaluation image generator, and
said lighting order modifying part performs a calculation where an ordinal number in said lighting order of each position included in at least said specified areas in said matrix area is divided by a value of a corresponding pixel in said evaluation image, or a calculation where said value of said corresponding pixel is subtracted from said ordinal number.

15. The threshold matrix generation apparatus according to claim 10, wherein
said lighting order modifying part magnifies degree of change of an ordinal number on each position included in said specified areas by using a function where an output value becomes greater as an ordinal number which is inputted becomes close to the median value in said lighting order.

16. The threshold matrix generation apparatus according to claim 10, wherein
a size of a filter used in said smoothing operation is made not smaller than one time and not larger than 4.25 times an average distance between the centers of dots generated in halftone dot areas in highlight-side gray level, with respect to each of a row direction and a column direction of said matrix area.

17. A computer-readable recording medium in which data of a threshold matrix compared with a grayscale original image in generating a halftone dot image representing said original image is recorded, said data being generated by executing steps including the steps of:
a) setting ordinal numbers in lighting order to respective positions within a matrix area in which a threshold matrix is generated so that connecting of dots of halftone dot areas occurs at random with increase of gray level within a predetermined range, said lighting order indicating an order for including pixels in said halftone dot areas with increase of gray level;
b) binarizing said ordinal numbers in said matrix area on the basis of a specified gray level within said predetermined range of gray level to generate a tint image;
c) generating a grayscale evaluation image by performing a smoothing operation on said tint image;
d) modifying said lighting order by changing ordinal numbers of positions included in at least specified areas which correspond to areas around boundaries of halftone dot areas in said tint image on the basis of values of corresponding pixels in said evaluation image; and
e) determining threshold values in said matrix area with reflecting a modified lighting order, wherein
a variation among values of pixels included in said specified areas in a grayscale image which is generated by performing steps b) and c) on ordinal numbers in said modified lighting order is smaller than a variation among values of pixels included in said specified areas in a grayscale image which is generated by performing steps b) and c) on ordinal numbers in said lighting order which is set in said step a).

18. The recording medium according to claim 17, wherein
a plurality of halftone cells are set in said matrix area and ordinal numbers in lighting order are set in respective positions within said matrix area so that halftone dot areas vary with change in gray level in accordance with shapes of said plurality of halftone cells in said step a).

19. The recording medium according to claim 18, wherein
said plurality of halftone cells are set at random in irregular shapes in said matrix area in said step a).

20. The recording medium according to claim 18, wherein
a plurality of highlight-side halftone cells in each of which a halftone dot area grows from the center toward a peripheral portion according to increase in highlight-side gray level and a plurality of shadow-side halftone cells in each of which a halftone dot area grows from a peripheral portion toward the center according to increase in shadow-side gray level are included in said plurality of halftone cells.

21. The recording medium according to claim 17, wherein
a halftone structure is removed from said tint image by performing said smoothing operation in said step c), and
said step d) includes a calculation where an ordinal number in said lighting order of each position included in at least said specified areas in said matrix area is divided by a value of a corresponding pixel in said evaluation image, or a calculation where said value of said corresponding pixel is subtracted from said ordinal number.

22. The recording medium according to claim 17, wherein
degree of change of an ordinal number on each position included in said specified areas is magnified by using a function where an output value becomes greater as an ordinal number which is inputted becomes close to the median value in said lighting order in said step d).

23. The recording medium according to claim 17, wherein
a size of a filter used in said smoothing operation is made not smaller than one time and not larger than 4.25 times an average distance between the centers of dots generated in halftone dot areas in highlight-side gray level, with respect to each of a row direction and a column direction of said matrix area.

* * * * *